Patented July 17, 1934

1,966,756

UNITED STATES PATENT OFFICE 1,966,756

DISSOLVING FIBROIN

Fritz Gajewski, Berlin-Charlottenburg, Heinrich Fink and Ernst Rossner, Premnitz, and Herbert Mahn, Dessau in Anhalt, Germany, assignors to I. G. Farbenindustrie Aktiengesellschaft, Frankfort-on-the-Main, Germany No Drawing. Application November 25, 1930, Serial No. 498,198. In Germany November 30, 1929

10 Claims. (Cl. 134—1)

Our present invention relates to the production of solutions of fibroin.

One of its objects is to provide a new solvent for fibroin.

Additional objects are the new solutions of fibroin.

Further objects of our invention will be seen from the detailed specification following hereafter.

We have found that anhydrous liquid ammonia preferably when cooled to a temperature near its freezing point, is an excellent solvent for fibroin.

As a starting material we prefer the waste of natural silk produced by the mulberry silkworm, Bombyx Mori, in form of breeding or faulty cocoons, or the outer floss of the cocoon degummed or not degummed, the comber or other waste left in the silk industry.

For a successful procedure certain essential conditions are preferably maintained.

The genuine mulberry silk should be freed as far as possible from the mucoidine and the silk gum. Even when starting from natural silk sufficiently scoured for textile purposes, we prefer to subject the silk to a further degumming process, as the degree of scouring required by the textile industry in some cases is not sufficient to guarantee a smooth solubility of the fibroin in liquid ammonia. For the said purpose and for scouring the genuine silk, we may employ the well known scouring processes as, for instance, boiling the silk with a soap solution and/or a slight soda solution or with an aqueous solution containing triethanolamine, or by subjecting the silk to the action of ferments dissolving the silk gum. We prefer to include into the degumming process a treatment with a compound of acid reaction, such as a bath containing a mineral or an organic acid. When boiling the silk with an acetic acid of about 1½–3 per cent strength, it is not necessary to completely wash out the acid adhering to the fibers; the latter may be dried after centrifuging without washing.

When dissolving the carefully scoured silk waste consisting nearly quantitatively of fibroin, the temperature of the liquid ammonia serving as a solvent, is of high importance. Whereas, for instance, liquid ammonia of a temperature of about −46 to −48° C. dissolves in about 3 hours only 10 to 20 per cent of the fibroin, at a temperature of about −77° C. a complete solution occurs in a few minutes. Such solutions of fibroin in liquid ammonia made at a low temperature, gelatinize completely in a closed vessel at room temperature and become liquid again by cooling. Solutions containing up to 25 per cent of fibroin are thus obtainable when maintaining a dissolving temperature lower than −70° C. These solutions may be concentrated by partly evaporating the ammonia. When carrying out the evaporation while thoroughly stirring the solution, the latter becomes strongly viscous without separation of fibroin and, finally, gelatinizes. A further concentration of the gelatinized solution is connected with difficulties, since the viscosity of the gel does not permit a uniform mixing, so that a film is formed on the surface of the gel which makes the product unhomogeneous.

It may be mentioned that the temperature of the liquid ammonia serving as a solvent, may be raised when dissolving fibroin precipitated from a solution in a known solvent such as a strong mineral acid. It is possible to obtain solutions of fibroin of higher concentration and of a diminished viscosity when using a starting material which partly is decomposed by the degumming process. These solutions, however, are not so valuable for spinning silk threads, as the threads obtained show a diminished tenacity. They may be worked up for other purposes, for instance, for sizing, dressing or other preparations.

The invention may be illustrated by the following example:—

Undegummed waste of mulberry silk is thoroughly freed from sericin by boiling it for 6 hours in a solution of Marseilles soap of 1 per cent strength. The soap bath is used in the ratio 1:25 and the vessel is heated by indirect steam. The soap bath is renewed thrice or four times, whereat the liquid used in the second boiling operation is used in the known manner as the first boiling lye of the next batch of silk to be degummed. After having been boiled with soap solution, the silk is thoroughly washed with water, centrifuged and then boiled again for ½ hour with acetic acid of 2 per cent strength. The silk material thus degummed then is centrifuged again and carefully dried without washing at about 100° C.

850 parts of the fibroin thus pretreated, are introduced into a vessel provided with a stirrer and a cooling jacket and containing 7000 parts of liquid anhydrous ammonia of −77° C. After stirring for ½ hour, the clear thin-liquid, honey-colored solution is filtered through a fine-meshed sieve, for instance, of nickel-gauze, whereat remainders of the pupæ and other impurities are separated.

It is obvious that our invention is not limited to the foregoing example nor to the specific details given therein. Thus, for instance, the silk waste used as a starting material, may be degummed by one of the other well known silk scouring processes. In order to free the waste from impurities contained therein, such as the remains of the pupated silk worm, of excrements of the worm and so on, the silk threads may be carded.

The term "liquid ammonia" or "liquid anhydrous ammonia" where it occurs in the specification or the following claims is intended to comprise the liquefied gas corresponding to the formula NH₃ which, however may contain such quantities of water as are unavoidable in the liquefaction when operated on a commercial scale.

What we claim is:—

1. A process which comprises dissolving fibroin in liquid ammonia.

2. A process which comprises dissolving fibroin produced by the mulberry silkworm in liquid ammonia.

3. A process which comprises dissolving fibroin in liquid ammonia cooled to a temperature near the freezing point.

4. A process which comprises dissolving fibroin produced by the mulberry silkworm in liquid ammonia cooled to a temperature near the freezing point.

5. A process which comprises degumming completely natural silk produced by the mulberry silkworm, boiling the degummed product with an organic aliphatic acid of about 1½–3 per cent strength, removing the acid, drying the degummed silk still wet with acid and dissolving it in liquid ammonia.

6. A process which comprises degumming completely natural silk produced by the mulberry silkworm, boiling the degummed product with an organic aliphatic acid of about 1½–3 per cent strength, removing the acid, drying the degummed silk still wet with acid and dissolving it in liquid ammonia cooled to a temperature near the freezing point.

7. A process which comprises degumming completely natural silk produced by the mulberry silkworm, boiling the degummed product with acetic acid of about 1½–3 per cent strength, removing the acid, drying the degummed silk still wet with acid, and dissolving 850 parts of the material thus pretreated in 7000 parts by weight of liquid ammonia cooled to a temperature of about —77° C.

8. As a new article of manufacture a solution of fibroin in liquid ammonia.

9. As a new article of manufacture a solution of fibroin produced by the mulberry silkworm in liquid ammonia, the said solution being a clear, relatively thin-liquid, honey-colored liquor at a temperature near the freezing point of ammonia, gelatinizing in a pressure vessel at about room temperature and becoming liquid again by cooling.

10. As a new article of manufacture a solution of fibroin produced by the mulberry silkworm in liquid ammonia, the said solution containing up to 25 per cent of fibroin, being a clear, relatively thin-liquid, honey-colored liquor at a temperature near the freezing point of ammonia, gelatinizing in a pressure vessel at about room temperature and becoming liquid again by cooling.

FRITZ GAJEWSKI.
HEINRICH FINK.
ERNST ROSSNER.
HERBERT MAHN.